United States Patent [19]

Knoche

[11] 4,350,227
[45] Sep. 21, 1982

[54] WHEELCHAIR BRAKE ASSEMBLY

[75] Inventor: Raymond E. Knoche, Creve, Couer, Mo.

[73] Assignee: Bohn & Dawson, St. Louis, Mo.

[21] Appl. No.: 181,179

[22] Filed: Aug. 25, 1980

[51] Int. Cl.³ .............................................. B60T 1/04
[52] U.S. Cl. .................... 188/2 F; 74/479; 74/491; 280/242 WC; 280/289 WC; 297/DIG. 4
[58] Field of Search ......................... 188/2 F, 106 R; 280/242 WC, 289 WC; 297/DIG. 4; 74/503, 504, 515 E, 491, 479, 561

[56] References Cited

U.S. PATENT DOCUMENTS

| 1,930,032 | 10/1933 | Apple | 188/106 R |
|---|---|---|---|
| 2,426,451 | 8/1947 | Hammack | 188/2 F |
| 2,654,416 | 10/1953 | Maniscalco | 297/DIG. 4 |
| 3,301,574 | 1/1967 | Good | 188/2 F X |
| 3,709,338 | 1/1973 | Glen | 74/561 X |
| 4,083,598 | 4/1978 | Thomas | 297/DIG. 4 |
| 4,268,054 | 5/1981 | Twitchell et al. | 188/2 F |

Primary Examiner—George E. A. Halvosa
Attorney, Agent, or Firm—Cohn, Powell & Hind

[57] ABSTRACT

This brake assembly can be readily adapted for use with a conventional wheelchair. It provides a hand brake assembly adjacent each side frame including first and second links pivoted to the side frame and a third link connected between said first and second link. An arm rest is pivotally connected to the upper portion of each side frame and is connected at its front end by a link assembly to the hand brake assembly so that downward movement of the front of the arm rest actuates the hand brake assembly into engagement with the wheel.

7 Claims, 7 Drawing Figures

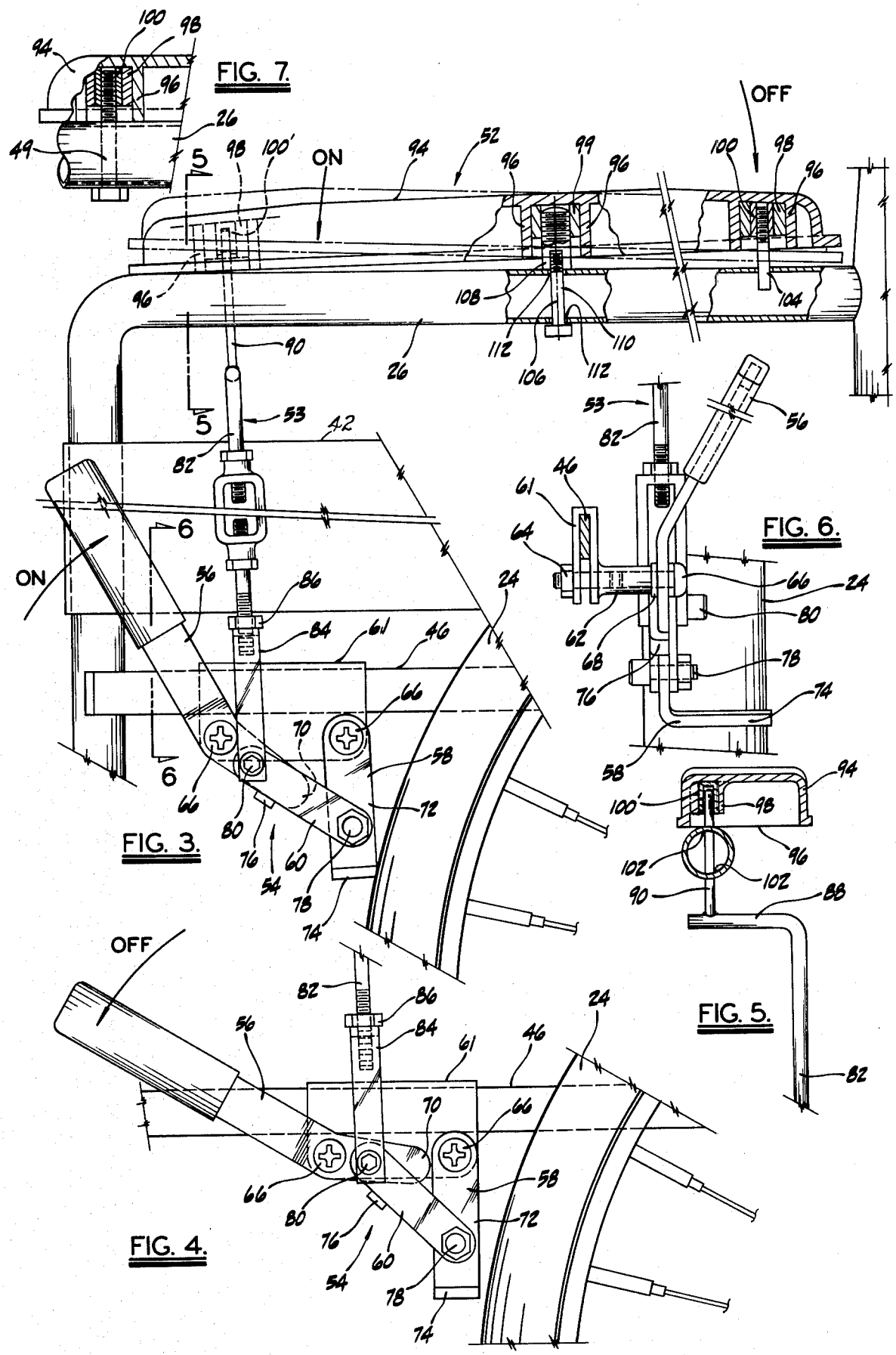

WHEELCHAIR BRAKE ASSEMBLY

BACKGROUND OF THE INVENTION

This invention relates generally to wheelchair brake assemblies and particularly to an assembly which is actuated by movement of the wheelchair arm rest.

Conventional wheelchairs, including the type which are folded for storage purposes, are invariably fitted with hand-operated brakes. These brakes engage the main drive wheels of the wheelchair, and are applied by the user, or a helper, before the user is seated in the wheelchair so that the wheelchair is stabilized. The brakes are released by hand once the user is seated to permit the wheelchair to become mobile. They are reapplied when the user wishes to leave the wheelchair.

Brakes of this conventional type are adequate when the user is not seriously physically handicapped and is in complete control of his mental faculties. However, when the user is handicapped to the point of being unable to operate the hand brake when he is occupying the chair, or being unable to stoop to operate the hand brake before he occupies the chair, they are quite inadequate. A seriously handicapped user, attempting unaided to get into a wheelchair, which is not locked into a stationary position, is faced with a difficult and dangerous task. Further, an unbraked wheelchair, which is used as a temporary support to assist in walking also presents a serious hazard to the user.

Because of this, various attempts have been made to provide an alternative wheelchair braking system.

The most pertinent known disclosure of an alternative wheelchair braking system which relates to the use of an arm rest in the operation of the system, is to be found in U.S. Pat. No. 2,426,451. This system relies for its operation on the use of a wheelchair arm rest which is in the form of an overhanging strip metal spring having a layer of brake shoe material underneath it which directly engages the wheel.

The present brake assembly represents an improvement over this and other known systems as will now be described.

SUMMARY OF THE INVENTION

This brake assembly can be easily adapted for use with a conventional wheelchair and provides a braking system which can be actuated into an on condition by simple manipulation of the arm rest.

The brake assembly is for use with wheelchairs of the type having opposed side frames each carrying a drive wheel, and the brake assembly includes a first link member pivotally mounted to one of the side frames, a second link member pivotally mounted to said side frame and including a brake shoe engageable with the wheel, and a third link member pivotally interconnecting the first and second link members. The assembly includes an arm rest having front and rear ends and means, pivotally mounting said arm rest to a side frame upper member intermediate the ends of the arm rest, for upward and downward movement of the arm rest ends. Link means connect one end of the arm rest to one of the link members whereby downward movement of one end of the arm rest moves the brake shoe into engagement with the wheel but upward movement of the same end of the arm rest does not move the brake shoe out of engagement with said wheel.

In one aspect of the invention the first link is provided with a brake handle.

In another aspect of the invention the link means includes an upper end connected to the front end of the arm rest and a lower end connected to the first and third link member at the pivotal connection between said members.

In another aspect of the invention the arm rest includes a guide member at the rear end thereof cooperating with the side frame to maintain alignment of the arm rest during upward and downward movement.

In still another aspect of the invention the link means includes an upper rod connecting the arm rest to the brake link members and a clevis connected to the first and third link members at the pivotal connection between said members said link means also includes an intermediate rod having a transverse upper portion connected to said upper rod, and a lower portion connected to said clevis, and means adjusting the length of the link means between the arm rest and link members.

In yet another aspect of the invention the wheelchair includes opposed pairs of identical arm rest brake assemblies at each side of the wheelchair providing for braking engagement of each wheel.

BRIEF DESCRIPTION OF THE DRAWINGS

FIG. 3 is an enlarged fragmentary side elevational view showing details of the brake assembly with the brake engaged;

FIG. 4 is a similar view of the assembly with the brake disengaged;

FIG. 5 is a cross-sectional view taken on line 5—5 of FIG. 3;

FIG. 6 is a cross-sectional view taken on line 6—6 of FIG. 3, and

FIG. 7 is a fragmentary view of a conventional wheelchair arm rest connection.

DESCRIPTION OF THE PREFERRED EMBODIMENT

Figure 1:
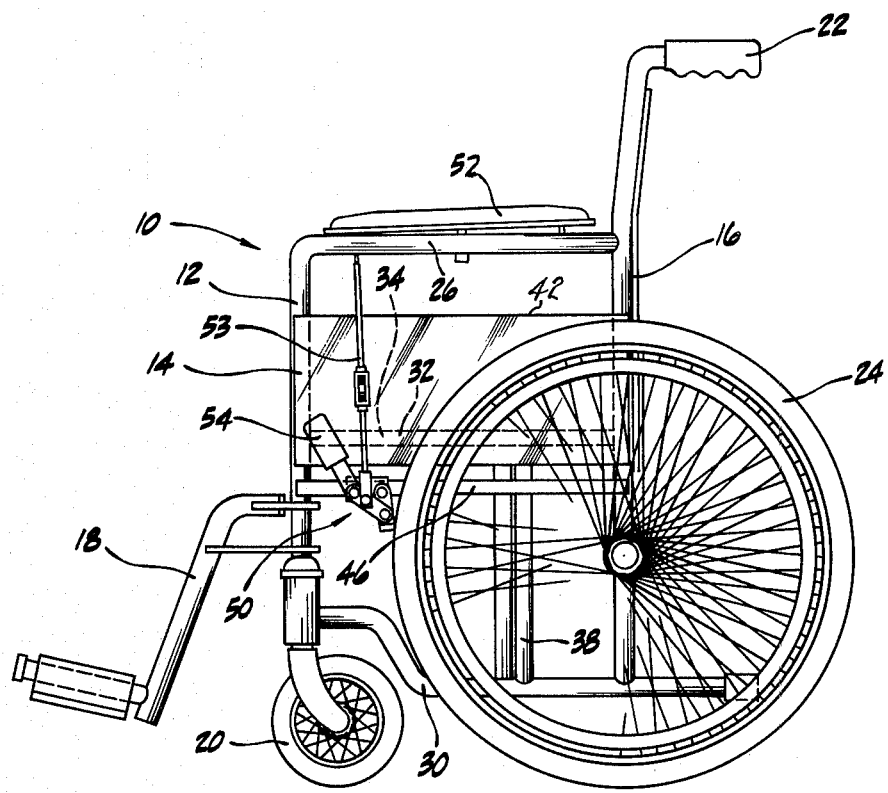
FIG. 1 is a side-elevational view of a conventional folding wheelchair incorporating the improved brake assembly.

Referring now by reference numerals to the drawings and first to FIG. 1, it will be understood that the wheelchair, generally indicated by numeral 10, is conventional in that it includes a pair of opposed side frames 12 each having front and rear upright members 14 and 16. The front member 14 carries footrest portion 18 and terminates in a mounting for the front wheel 20. The rear member 16 provides push handles 22 at its upper end and includes stub axles carrying the main drive wheels 24. The upright members 14 and 16 are interconnected by a plurality of longitudinal members including an upper horizontal member 26, a lower member 30 and an intermediate member 46.

Figure 2:
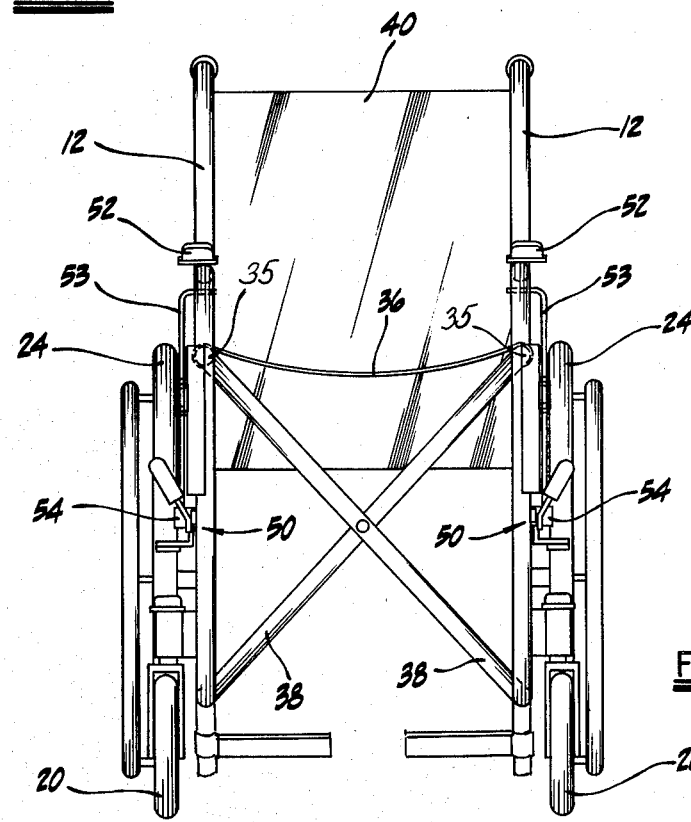
FIG. 2 is a front-elevational view of the wheelchair in its operative condition.

The wheelchair 10 is provided with a seat portion 32, which includes horizontal members 34 slidingly mounted between the front and rear upright members 14 and 16 and interconnected by a foldable flexible panel 36 as by fasteners. The folding of the wheelchair 10 from an operative condition, shown in FIG. 2, to an inoperative condition (not shown), is effectuated by the provision of a pair of cross members 38 pivoted at their center to provide an X-frame. The upper ends of the cross members 38 are rigidly connected to horizontal frame members 34 which include relatively rotatable end plugs 35 of teflon, or the like, arcuately formed for sliding connection to said upright members 14 and 16. Members 38 are rotatably connected at their lower end to the lower frame member 30. In this way, the opposed side frames 12 can be urged toward each other as shown in FIG. 3 with the result that the seat portion horizontal sliding members 38 move upwardly, as the upper ends and lower ends of the cross members 38 are moved transversely toward each other into a folded or collapsed condition. The side frames 12 of the wheelchair 10 are also interconnected by a back panel 40, and each side frame includes a side panel 42, connected between upright members 14 and 16.

Conventional wheelchairs include a pair of fixed arm rests mounted to the upper horizontal members as by bolts 49, attached thereto as shown in FIG. 7. A hand-operated brake system is also provided for conventional wheelchairs which is mounted at each side of the wheelchair on intermediate horizontal members 46 extending between, and rigidly connected to, upright members 14 and 16. The present embodiment provides a brake assembly system 50 which uses a modified arm rest 52 and a modified hand brake 54 which are interconnected for cooperating action by an associated vertical linkage assembly 53 and this system can be readily adapted for use with a conventional wheelchair of the type described above. The brake assembly 50 will now be described with particular reference to FIGS. 3 through 6.

As shown in FIGS. 3 and 4, the hand brake 54 is conventional in that it includes a handle member 56, pivotally mounted to the side frame 12; a brake shoe member 58, pivotally mounted to the said side frame; and a double interconnecting member 60, pivotally connected between said handle member 56 and said brake shoe member 58. More specifically, the pivotal mounting to the side frame 12 of the handle member 56, which constitutes a first link member, and the brake member 58, which constitutes a second link member, is achieved by means of a U-shaped bracket 61. As clearly shown in FIG. 6, the bracket 61 includes a pair of outstanding, internally threaded posts 62 which are integrally formed with the bracket 61. The bracket 61 is connected to side frame member 46 by means of fasteners 64 received by the posts 62, and said posts also provide a mounting for fasteners 66, which include spacer washers 68 of teflon or the like to facilitate pivotal action. The handle member 56 is cranked at the lower end 70 and is aligned with an upright portion 72 of the brake shoe member 58, said brake shoe member having an outstanding brake shoe portion 74 engageable with the wheel 24. The interconnecting member 60, which constitutes a third link member, is formed from a pair of side members one of which includes an integrally formed stop member 76 engageable with the handle member cranked end 70 to prevent handle over-ride. The interconnecting member 60 is attached at one end to the brake shoe member upright portion 72 by means of a pivot bolt assembly 78, and at the other end by a pivot bolt assembly 80.

As shown in FIGS. 3 and 6, the vertical link assembly 53, which constitutes a link means, consists essentially of an elongate rod 82, which is threaded at the lower end to receive a compatibly threaded clevis 84, and is provided with a locknut 86. The clevis 84 is attached to the brake handle lower end 70 by the pivot bolt assembly 80. At its upper end, as shown in FIG. 5, the linkage assembly rod 82 includes a bent portion 88; an upwardly extending rod 90 is connected thereto and is attached at its upper end to the arm rest 52 as will be described.

The arm rest 52, in the preferred embodiment, is conventional in that it includes a body 94, which is formed of molded plastic, or the like, and is connected to the apertured side frame upper member 26 at the front and rear ends and also intermediate said ends. However, in lieu of being bolted to member 26, as shown in FIG. 7, the connection is generally pivotal in nature as will be described.

The body 94, as clearly shown in FIG. 3, is provided with spaced pairs of transverse ribs 96. Each pair of end ribs is provided with integrally formed end plugs 98 therebetween and the intermediate ribs are provided with a similar plug 99. The front and rear plugs 98 include inserts 100' and 100 respectively. The front insert 100' has, relatively speaking, a slightly oversize bore to slidingly receive the end of the vertical linkage rod 90, which is received through openings 102 provided in the side frame upper member 26. The rear insert 100 is threaded to receive the compatibly threaded end of a guide rod 104 which is received through an opening provided in said side frame upper member. The arm rest body 94 is pivotally mounted to the side frame upper member 26 by means of a pivot pin 106 having an upper threaded portion 108 received directly into the compatibly threaded plug 99. The pivot pin 106 constitutes a pivot connection means providing a rocker-like connection and includes a reduced shank portion formed from a bolt 110 threadedly received within the upper portion 108 and fixedly attached thereto. The bolt 110 is received within openings 112 provided in the side frame upper member 26, and said pivot pin 106 is held in place by the spaced shoulders provided by the upper portion 108 and the head of the bolt 110. The openings 112 are sufficiently large to provide longitudinal play for the pivot pin 106 to facilitate the rocker effect and permit the arm rest 52 to move between the "on" position of the brake, shown in FIG. 3, and the "off" position shown in FIG. 4, the position of the arm rest in the "off" position being shown in phantom outline in FIG. 3.

The sliding relationship between the vertical linkage rod 90 and the front insert 100' provides that downward movement of the front end of the arm rest 52 from the "off" position to the "on" position induces downward movement into said rod 90 because of engagement between said rod and the end of the insert 100' and actuates the brake into the "on" position. However, upward movement of the arm rest 52 does not, of itself, affect the brake.

It is thought that the structural and functional advantages of this arm rest brake assembly have become fully apparent from the foregoing description of parts but for completeness of disclosure the installation and operation of the device will be briefly described.

Conventional wheelchairs, whether of the folding type or otherwise, are readily fitted on each side with the brake assembly 50 described above. For example, in one embodiment of a conventional wheelchair the arm rest provided is of the general form described above and is connected to the upper member 26 of the wheelchair side frame 12 by means of bolts 49, such as shown in FIG. 7, which pass through openings in said member 26, said bolts being threadedly connected within compatibly threaded sockets 100 provided in the plugs 98. The arm rest brake assembly 50 is installed by removing the front and rear bolts and substituting the upper linkage rod 90 and the guide rod 104 respectively. In those instances in which an intermediate bolted connection is provided for the wheelchair arm rests, it is a simple matter of threading the plug 99 to accept the pivot pin upper threaded portion 108 and enlarging the size of frame member openings 112 as necessary to provide the desired rocker movement.

By the same token, the hand brake assembly described above is commonly found on conventional wheelchairs. In order to modify such wheelchairs to include the brake assembly described it is merely a question of removing the existing pivot bolt assembly which connected the handle member 56 to the intermediate member 60, and replacing it with a longer bolt assembly 80.

It will be understood that, in the embodiment shown, the linkage assembly 53 connecting the arm rest 52 to the hand brake 52 can be lengthwise adjusted at either the upper connection of the main rod 82, to the upper rod 90 or to the lower connection to the clevis 84. Such adjustment provides the brake assembly with a degree of flexibility in installation and obviates the need for a high degree of exactitude in the length of the linkage assembly to achieve the desired toggle action of the hand brake 52.

The brake assembly 50 is moved into an "on" condition, which is shown in FIG. 3, by depressing the front end of the arm rest 52. This rotates the handle member 56 about the pivot 66 in the same way as if this member were manually moved into the "on" condition. As will be readily understood, this arm rest movement can be effectuated very easily by a handicapped person, unable to actuate the manual lever, by simply leaning with his hands on the front portion of the arm rest 52. Normally such person, wishing to seat himself in the wheelchair will do so by turning himself into an incipient seating position in which his back faces the back panel 40 and his hands are placed on the front portion of the arm rest to depress it if this has already not been done. At this stage, the brake assembly 50 is fully applied and the wheelchair user can simply lower himself into the seat. Once the user has lowered himself into the wheelchair there is a natural inclination for him to rest his arms from elbow to wrist lengthwise of the arm rest 52. However, although this action tends to rotate the arm rest 52, and move the front end upwardly, it does not raise the rod 90 because of the sliding relation between said rod and the insert 100'. The brake is not placed in the "off" position until the brake lever 56 is rotated by hand into the "off" position, at which time the wheelchair can be propelled in the normal fashion. When it is desired to apply the brake again, pressure on the forward portion of the arm rest 52 from the users hands will accomplish this. By the same token, when a user wishes to remove himself from the wheelchair, pressing his hands on the front portion of the arm rest will immediately apply the brake so that he may then raise himself from the wheelchair in the normal way with the wheelchair in the braked condition.

Thus, although a wheelchair user can readily actuate the brake into an "on" condition by means of the arm rest 52, the sliding action connection of the rod 90 with the insert 100' prevents the arm rest from actuating the brake into an "off" position.

Conventional wheelchairs are provided with hand brakes on each side of the wheelchair, which, like the arm rests, are substantially formed in mirror image of each other. It will be understood that the hand brakes and arm rests at both sides can be readily modified in the manner described above to provide a dual braking system.

I claim as my invention:

1. A brake assembly for a wheelchair having opposed side frames, each side frame carrying a drive wheel and having an upper longitudinal member, the brake assembly being selectively positionable in on and off positions, and comprising:
   (a) a first link member operatively pivotally mounted to one of the side frames,
   (b) a second link member operatively pivotally mounted to said side frame and including a brake shoe engageable with the wheel,
   (c) a third link member operatively pivotally interconnecting said first and second link members,
   (d) an arm rest having front and rear ends and including means pivotally mounting said arm rest to said side frame upper member, for upward and downward movement of said arm rest front end, and
   (e) link means connecting said arm rest to one of said link members, whereby downward movement of the front end of the arm rest moves the brake shoe into engagement with said wheel, the link means including an upper end connected to the arm rest and a lower end connected to the link members said brake assembly being actuated by said arm rest and associated linkage into an on position but not into an off position.

2. A brake assembly as defined in claim 1, in which:
   (f) the link means includes an upper rod having an upper end slidably connected to the arm rest, a lower clevis connected to said first and third link members at the pivotal connection between said members, and an intermediate rod having a transverse upper portion connected to said upper rod and a lower portion connected to said clevis, said link means including means adjusting the length thereof between the arm rest and the link members.

3. A wheelchair comprising:
   (a) a pair of opposed side frames, each including:
      1. front and rear upright members, and
      2. an upper, lower and intermediate longitudinal member interconnecting said upright members,
   (b) a hand brake assembly adjacent each side frame and selectively positionable in on and off positions, each assembly including:
      1. a first link member pivotally connected to said intermediate longitudinal member and having a handle,
      2. a second link member pivotally connected to said intermediate longitudinal member and having a brake shoe engageable with the wheel,
      3. a third link member having one end pivotally connected to said first link member and the other end pivotally connected to said second link member,
   (c) an arm rest connected to each side frame, each arm rest having front and rear ends and including a pivot connection means disposed intermediate said arm rest ends connecting said arm rest to said side frame upper member for upward and downward movement of said arm rest ends, and
   (d) link means connecting each arm rest to one of the link members of a hand brake assembly whereby downward movement of the front end of the arm rest actuates the hand brake to move the brake shoe into engagement with said wheel, said hand brake assembly being actuated by said arm rest and associated linkage into an on position but not into an off position.

4. A wheelchair as defined in claim 3, in which:
 (e) each side frame upper member includes an intermediately disposed transverse opening extending downwardly therethrough, and
 (f) each arm rest pivot connection means includes a threaded socket portion, a compatibly threaded depending post portion received in threaded relation within said socket portion, said post portion having a lower end extending downwardly through said transverse opening and having a stop engageable with said side frame upper member.

5. A wheelchair as defined in claim 4, in which:
 (g) each side frame upper member includes a front transverse opening extending downwardly therethrough,
 (h) each arm rest includes a front socket portion, and
 (i) each link means includes a rod received in sliding relation within said front socket portion and engageable by said socket portion for movement of said rod in one direction, said rod extending downwardly through said transverse opening.

6. A brake assembly for a wheelchair having opposed side frames, each side frame carrying a drive wheel and having an upper longitudinal member, the brake assembly being selectively positionable in on and off positions, and comprising:
 (a) a first link member including a brake handle, the first link member being operatively pivotally mounted to one of the side frames,
 (b) a second link member operatively pivotally mounted to said side frame and including a brake shoe engageable with the wheel,
 (c) a third link member operatively pivotally interconnecting said first and second link members,
 (d) an arm rest having front and rear ends and including means pivotally mounting said arm rest to said side frame upper member, intermediate the ends of said arm rest, for upward and downward movement of said arm rest ends,
 (e) link means connecting one end of said arm rest to one of said link members, whereby downward movement of one end of the arm rest moves the brake shoe into engagement with said wheel,
 (f) the arm rest including a guide member at the rear end thereof cooperating with the side frame upper member to maintain alignment of the arm rest during upward and downward movement thereof, and
 (g) the link means including an upper rod slidably connected to the arm rest, a lower clevis connected to said first and third link members at the pivotal connection between said members, and an intermediate rod having a transverse upper portion connected to said upper rod and a lower portion connected to said clevis, said link means including means adjusting the length thereof between the arm rest and the link members said brake assembly being actuated by said arm rest and associated linkage into an on position but not into an off position.

7. A wheelchair comprising:
 (a) a pair of opposed side frames, each including:
  1. front and rear upright members, and
  2. an upper, lower and intermediate longitudinal member interconnecting said upright members,
 (b) a hand brake assembly adjacent each side frame and selectively positionable in on and off positions, each assembly including:
  1. a first link member pivotally connected to said intermediate longitudinal member and having a handle,
  2. a second link member pivotally connected to said intermediate longitudinal member and having a brake shoe engageable with the wheel,
  3. a third link member having one end pivotally connected to said first link member and the other end pivotally connected to said second link member,
 (c) each side frame upper member including:
  1. an intermediately disposed transverse opening extending downwardly therethrough,
  2. a front transverse opening extending downwardly therethrough, and
  3. a rear transverse opening extending downwardly therethrough,
 (d) an arm rest connected to each side frame, each arm rest having front and rear ends and including a pivot connection means disposed intermediate said arm rest ends connecting said arm rest to said side frame upper member for upward and downward movement of said arm rest ends,
 (e) each arm rest pivot connection means including a threaded socket portion, a compatibly threaded depending post portion received in threaded relation within said socket portion, said post portion having a lower end extending downwardly through said intermediately disposed transverse opening and having a stop engageable with said side frame upper member,
 (f) each arm rest including:
  1. a front socket portion, and
  2. a threaded rear socket portion and a downwardly depending guide rod received in threaded relation within said socket portion, said rod extending downwardly in guided relation into said rear transverse opening, and
 (g) link means connecting each front end of each arm rest to one of the link members of a brake assembly whereby downward movement of the front end of the arm rest moves the brake shoe into engagement with said wheel, said hand brake assembly being actuated by said arm rest and associated linkage into an on position but not into an off position.

* * * * *